United States Patent [19]

Ueda

[11] Patent Number: 5,010,513
[45] Date of Patent: Apr. 23, 1991

[54] DATA PROCESSING APPARATUS

[75] Inventor: Shigeru Ueda, Kamifukuoka, Japan

[73] Assignee: Canon Kabushiki Kaisha, Tokyo, Japan

[21] Appl. No.: 218,485

[22] Filed: Jul. 6, 1988

Related U.S. Application Data

[63] Continuation of Ser. No. 704,081, Feb. 21, 1985, abandoned.

[30] Foreign Application Priority Data

| Feb. 24, 1984 | [JP] | Japan | 59-33612 |
| Feb. 24, 1984 | [JP] | Japan | 59-33613 |
| Feb. 24, 1984 | [JP] | Japan | 59-33614 |
| Feb. 24, 1984 | [JP] | Japan | 59-33615 |
| Feb. 24, 1984 | [JP] | Japan | 59-33618 |

[51] Int. Cl.⁵ .................................... G06F 13/00
[52] U.S. Cl. .................. 364/900; 364/943.1;
364/920.7; 364/927.67; 364/968.1; 364/951.4;
364/968.3; 364/927.2; 364/965; 364/965.8;
364/966.1; 364/966.4; 364/968; 364/969;
364/969.1
[58] Field of Search ............... 364/518, 200 MS File,
364/900 MS File

[56] References Cited

U.S. PATENT DOCUMENTS

| Re. 30,331 | 7/1980 | Sorensen et al. | 364/200 |
| 4,099,256 | 7/1978 | Draper | 364/900 |
| 4,300,206 | 11/1981 | Belleson et al. | 364/900 |
| 4,424,572 | 1/1984 | Lorig et al. | 364/900 |
| 4,589,144 | 5/1986 | Namba | 364/518 |
| 4,591,997 | 5/1986 | Grabel | 364/518 |
| 4,592,010 | 5/1986 | Wollscheid | 364/900 |
| 4,670,841 | 6/1987 | Kostopoulos | 364/518 |
| 4,706,205 | 11/1987 | Akai et al. | 364/518 |
| 4,723,217 | 2/1988 | Nakano et al. | 364/518 |

FOREIGN PATENT DOCUMENTS

| 1558458 | 1/1980 | United Kingdom | 364/200 |
| 2117151 | 3/1983 | United Kingdom | 364/200 |

OTHER PUBLICATIONS

*Electronic Design* vol. 31, No. 12, pp. 161-166 (6/83) by B. Bigelow.

Primary Examiner—Bareth D. Shaw
Assistant Examiner—Rebecca L. Rudolph
Attorney, Agent, or Firm—Fitzpatrick Cella Harper Scinto

[57] ABSTRACT

A data processing apparatus comprises: a memory for storing image information as bit image data; a data converter for overlapping the bit image data with another data in the memory; and a control unit having a microprocessor for instructing the operation of the data converter, in which the data converter is activated by an activating order and performs the overlapping operation while the control unit is executing another order. The data converter has a data shifting circuit to shift the foregoing data by only desired bits and overlap it on the bit image data. The overlapping operation of the data into the memory and the clearing operation of the memory can be synchronously performed. With this apparatus, a memory having a large capacity can be effectively used and the burden on the CPU can be reduced upon writing of the data into the memory and a high data processing speed is obtained.

7 Claims, 14 Drawing Sheets

IC1

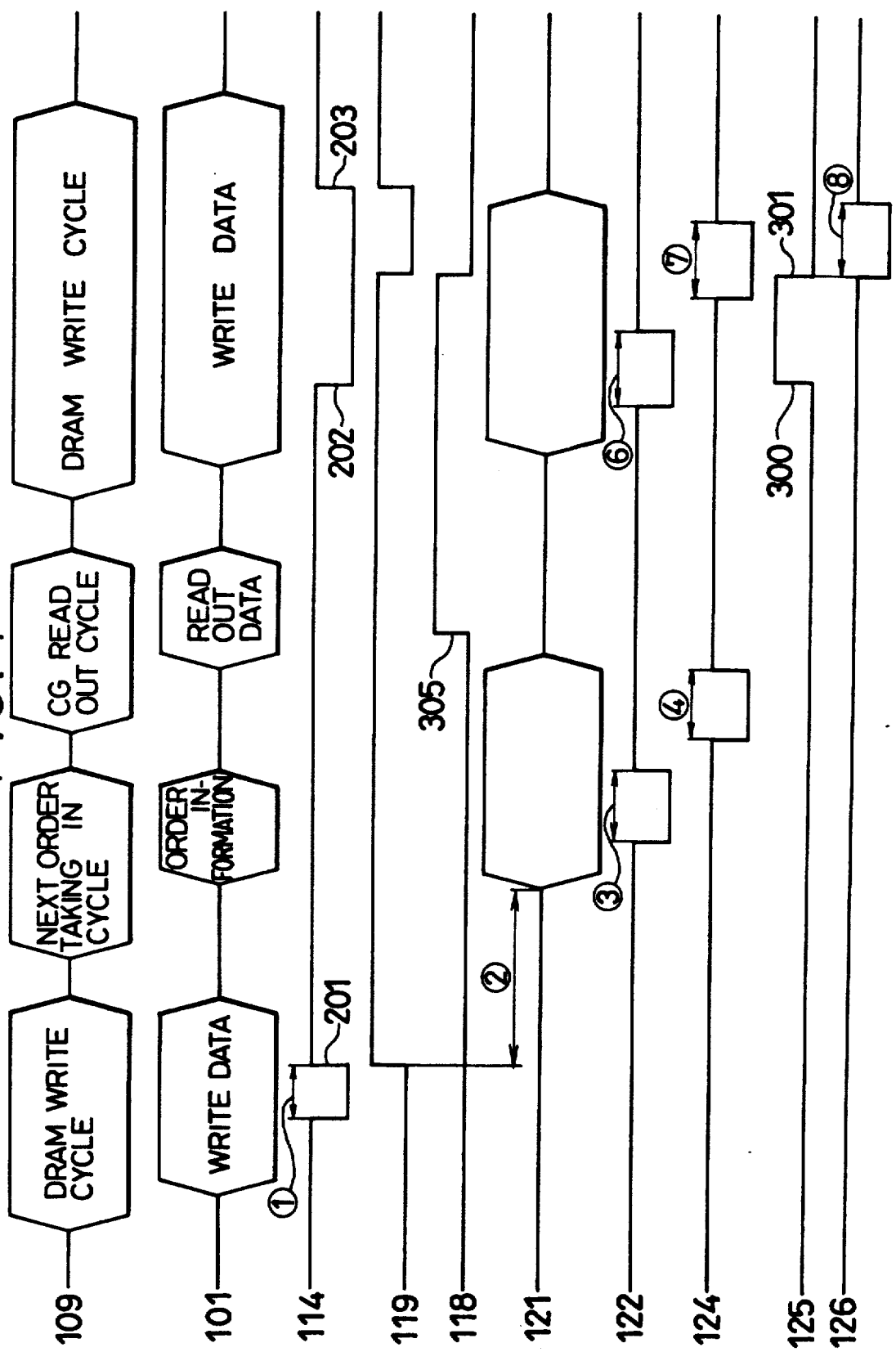

FIG. 6

| 118 | 104 | | | 116 | | | | | | | |
|---|---|---|---|---|---|---|---|---|---|---|---|
| | S2 | S1 | S0 | Ō7 | Ō6 | Ō5 | Ō4 | Ō3 | Ō2 | Ō1 | Ō0 |
| 0 | 0 | 0 | 0 | I7 | I6 | I5 | I4 | I3 | I2 | I1 | I0 |
| 0 | 0 | 0 | 1 | 0 | I7 | I6 | I5 | I4 | I3 | I2 | I1 |
| 0 | 0 | 1 | 0 | 0 | 0 | I7 | I6 | I5 | I4 | I3 | I2 |
| 0 | 0 | 1 | 1 | 0 | 0 | 0 | I7 | I6 | I5 | I4 | I3 |
| 0 | 1 | 0 | 0 | 0 | 0 | 0 | 0 | I7 | I6 | I5 | I4 |
| 0 | 1 | 0 | 1 | 0 | 0 | 0 | 0 | 0 | I7 | I6 | I5 |
| 0 | 1 | 1 | 0 | 0 | 0 | 0 | 0 | 0 | 0 | I7 | I6 |
| 0 | 1 | 1 | 1 | 0 | 0 | 0 | 0 | 0 | 0 | 0 | I7 |
| 1 | 0 | 0 | 0 | 0 | 0 | 0 | 0 | 0 | 0 | 0 | 0 |
| 1 | 0 | 0 | 1 | I0 | 0 | 0 | 0 | 0 | 0 | 0 | 0 |
| 1 | 0 | 1 | 0 | I1 | I0 | 0 | 0 | 0 | 0 | 0 | 0 |
| 1 | 0 | 1 | 1 | I2 | I1 | I0 | 0 | 0 | 0 | 0 | 0 |
| 1 | 1 | 0 | 0 | I3 | I2 | I1 | I0 | 0 | 0 | 0 | 0 |
| 1 | 1 | 0 | 1 | I4 | I3 | I2 | I1 | I0 | 0 | 0 | 0 |
| 1 | 1 | 1 | 0 | I5 | I4 | I3 | I2 | I1 | I0 | 0 | 0 |
| 1 | 1 | 1 | 1 | I6 | I5 | I4 | I3 | I2 | I1 | I0 | 0 |

FIG.14

| 209 | 208 | | | 215 | | | | | | | |
|---|---|---|---|---|---|---|---|---|---|---|---|
| | S2 | S1 | S0 | 07 | 06 | 05 | 04 | 03 | 02 | 01 | 00 |
| 0 | 0 | 0 | 0 | I7 | I6 | I5 | I4 | I3 | I2 | I1 | I0 |
| 0 | 0 | 0 | 1 | 0 | I7 | I6 | I5 | I4 | I3 | I2 | I1 |
| 0 | 0 | 1 | 0 | 0 | 0 | I7 | I6 | I5 | I4 | I3 | I2 |
| 0 | 0 | 1 | 1 | 0 | 0 | 0 | I7 | I6 | I5 | I4 | I3 |
| 0 | 1 | 0 | 0 | 0 | 0 | 0 | 0 | I7 | I6 | I5 | I4 |
| 0 | 1 | 0 | 1 | 0 | 0 | 0 | 0 | 0 | I7 | I6 | I5 |
| 0 | 1 | 1 | 0 | 0 | 0 | 0 | 0 | 0 | 0 | I7 | I6 |
| 0 | 1 | 1 | 1 | 0 | 0 | 0 | 0 | 0 | 0 | 0 | I7 |
| 1 | 0 | 0 | 0 | 0 | 0 | 0 | 0 | 0 | 0 | 0 | 0 |
| 1 | 0 | 0 | 1 | I0 | 0 | 0 | 0 | 0 | 0 | 0 | 0 |
| 1 | 0 | 1 | 0 | I1 | I0 | 0 | 0 | 0 | 0 | 0 | 0 |
| 1 | 0 | 1 | 1 | I2 | I1 | I0 | 0 | 0 | 0 | 0 | 0 |
| 1 | 1 | 0 | 0 | I3 | I2 | I1 | I0 | 0 | 0 | 0 | 0 |
| 1 | 1 | 0 | 1 | I4 | I3 | I2 | I1 | I0 | 0 | 0 | 0 |
| 1 | 1 | 1 | 0 | I5 | I4 | I3 | I2 | I1 | I0 | 0 | 0 |
| 1 | 1 | 1 | 1 | I6 | I5 | I4 | I3 | I2 | I1 | I0 | 0 |

DATA PROCESSING APPARATUS

This application is a continuation of application Ser. No. 704,081 filed 2/21/85, now abandoned.

BACKGROUND OF THE INVENTION

1. Field of the Invention

The present invention relates to an apparatus which can process data at a high speed especially an apparatus for processing data for the purpose of forming an image.

2. Description of the Prior Art

Hitherto, in data processing apparatuses such as a printer or the like of the type whereby sentences and image information are outputted as bit images, it is required to develop the foregoing information at arbitrary locations in a page on a bit unit basis. However, the readout from or writing in a memory is generally performed on a plurality of bit unit basis such as a four- or eight-bit unit from viewpoints of the processing speed or efficiency of a CPU. Therefore, a method has been adopted whereby data is preliminarily shifted on a bit unit basis by a register in a CPU and thereafter it is stored in the memory on the basis of a unit of four or eight bits.

However, the foregoing method has a drawback such that the data processing speed is slow in high speed printers such as, in particular, a laser beam printer (LBP). In addition, in many cases, a problem on realization of high processing speed is caused in various kinds of data processing apparatuses using a microprocessor or the like as well as the printers.

On one hand, in output apparatuses such as a laser beam printer (LBP) or the like of the type in which information such as code data or the like which is transmitted from a host computer or the like is developed as a bit image in a random access memory in the apparatus and thereafter this bit image is read out and outputted, it is necessary to overlappingly write it into the random access memory.

Namely, for instance, in case of outputting a pattern of FIG. 1(a), a pattern of FIG. 1(b) is once written and thereafter a pattern of FIG. 1(c) is overlappingly written. It is very difficult to discriminate the pattern to be written to see if it is merely written or overlappingly written, so that there is a necessity to preliminarily clear the random access memory in which the pattern is to be written.

Therefore, with regard to the portion where a pattern was completely developed in the random access memory and has been again read out and printed, it is necessary to clear that portion at every time.

However, the above-mentioned operation can be realized by the operation of only the CPU if the sentence output apparatus is of the low speed type and the processing speed of the CPU can sufficiently cope with such a low output speed. However, the low speed operation of the CPU is useless in high speed printers such as a laser beam printer or the like and, therefore, the parallel processes are ordinarily executed together with the CPU by use of a high speed subprocessor. This causes a drawback such that the cost of the overall processing apparatus becomes very high.

On the other hand, recently, an LSI is installed in a data processing apparatus and multi functions are being realized. It is becoming a general method that with an increase in capacity of the RAM, the content of one kind of RAM is divided into a data buffer, stack, flag area or the like and is used.

However, as described above, in the laser beam printer or the like in which sentence information such as code data or the like which is transmitted from a host computer or the like is developed as bit thereafter the bit images are read out and outputted, it is considered to be effective to provide a data conversion writing device such that the bit image is shifted and overlappingly written into the data buffer, such as table format + data because of necessity of the high speed process.

However, in case of using the same RAM as a flag or stack, the operation of the data conversion writing device causes the content of the flag or stack to be changed; therefore, there is a drawback such that this electronic equipment cannot execute a desired function.

SUMMARY OF THE INVENTION

The present invention is made in consideration of the foregoing points and intends to provide a data processing apparatus which can process data at a high speed with an inexpensive arrangement.

Another object of the invention is to provide a data processing apparatus which can lighten a load of a CPU upon writing of data into a memory.

Still another object of the invention is to provide a data processing apparatus which can effectively use a memory of a large capacity.

Still another object of the invention is to provide a data processing apparatus which can overlappingly write data into a memory while the CPU is executing another order.

Still another object of the invention is to provide a data processing apparatus which can synchronously perform the overlap writing of data into a memory and the clearing of the memory.

Still another object of the invention is to provide a data processing apparatus which can divide a memory into the area in which the data conversion is possible and the area in which the data conversion is impossible and can use this divided memory.

The above and other objects and features of the present invention will be apparent from the following detailed description in conjunction with the accompanying drawings.

BRIEF DESCRIPTION OF THE DRAWINGS

FIG. 3-1 is a block diagram for explaining the relation between a host computer and a printer;

FIG. 3-2 is a block diagram showing the details of a data converting section;

FIG. 4 is a timing chart of each signal shown in FIGS. 3-1 and 3-2;

FIG. 6 is an explanatory diagram of information stored in a ROM 105;

FIG. 14 is an explanatory diagram of information stored in a ROM 401.

DETAILED DESCRIPTION OF PREFERRED EMBODIMENTS

Figure 1A:
FIG. 1 is a diagram for explaining the overlap writing in which after a pattern of (b) was written, a pattern of (c) is overlappingly written and a pattern of (a) is outputted.
Figure 1B:
Figures 1C, 2:
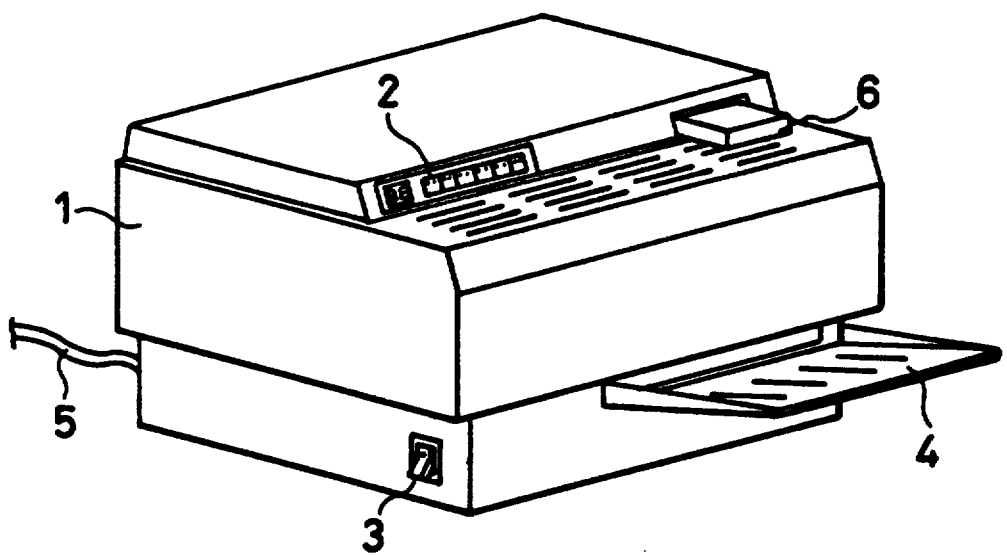
FIG. 2 is a diagram showing an outside appearance of a printer to which the present invention is applied.

The present invention will now be described in detail hereinbelow with reference to the drawings. FIG. 2 is a diagram showing an outside appearance of a page printer as a laser beam printer to which the invention is applied. A reference numeral 1 denotes a printer main body; 2 is an operation display section; 3 a power switch; 4 a paper discharge section on which recorded sheets are taken out; and 5 a transmission cable which is connected to a host computer 10 (refer to FIG. 3-1). The printer 1 may be a terminal in a network or a facsimile. As an interface, an interface system made by Sentronics Co., Ltd., RS232-C system or a system whereby a video signal is inputted may be employed. The operation display section 2 is provided with: an 'ON LINE' key representing that data is transmitted from the host computer; an 'ERROR SKIP' key to skip an error; a self diagnosis key; a key to select a manual sheet inserting mode whereby a recording is performed on the sheet inserted manually; a key to output data as much as the transmitted data instead of a printing for every page; or the like. A numeral 6 indicates a ROM cartridge in which character fonts such as alphabets, Japanese characters or the like, or a program have been stored.

Figures 1, 3:
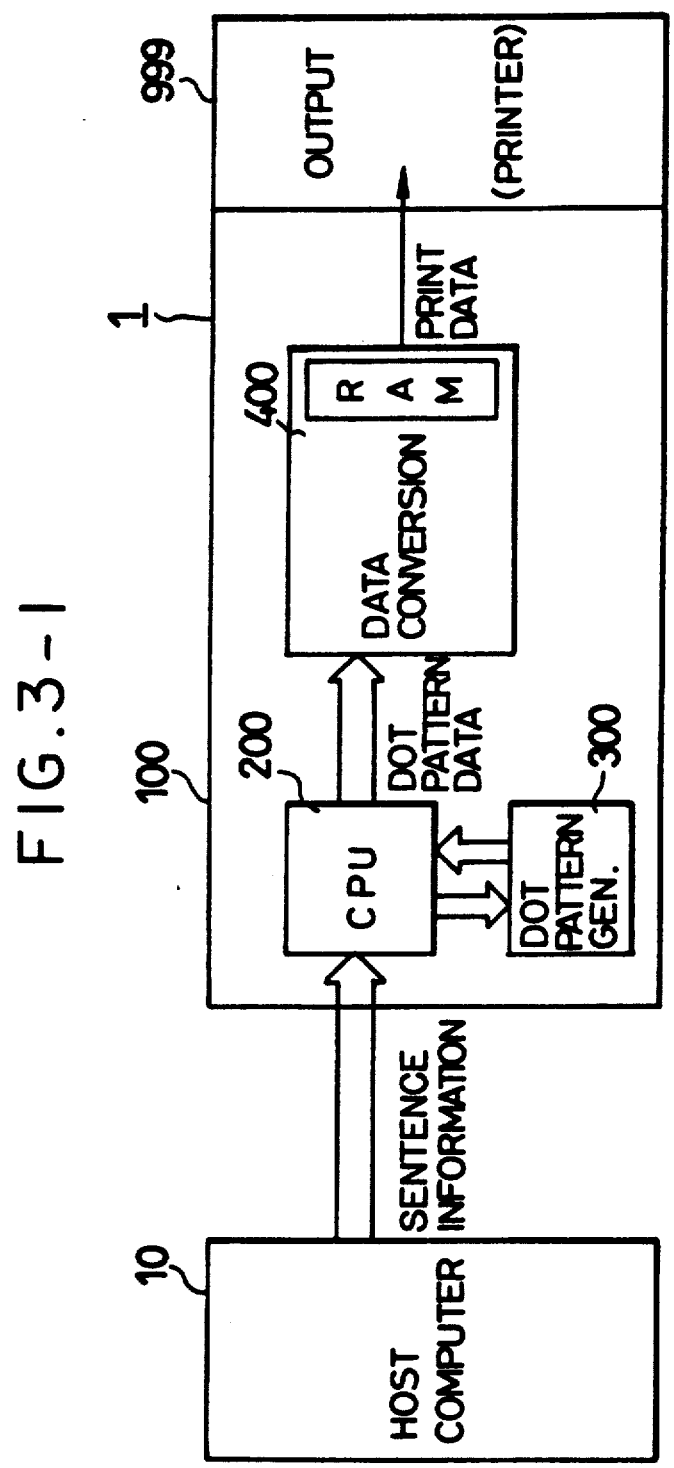
Figures 2, 3:
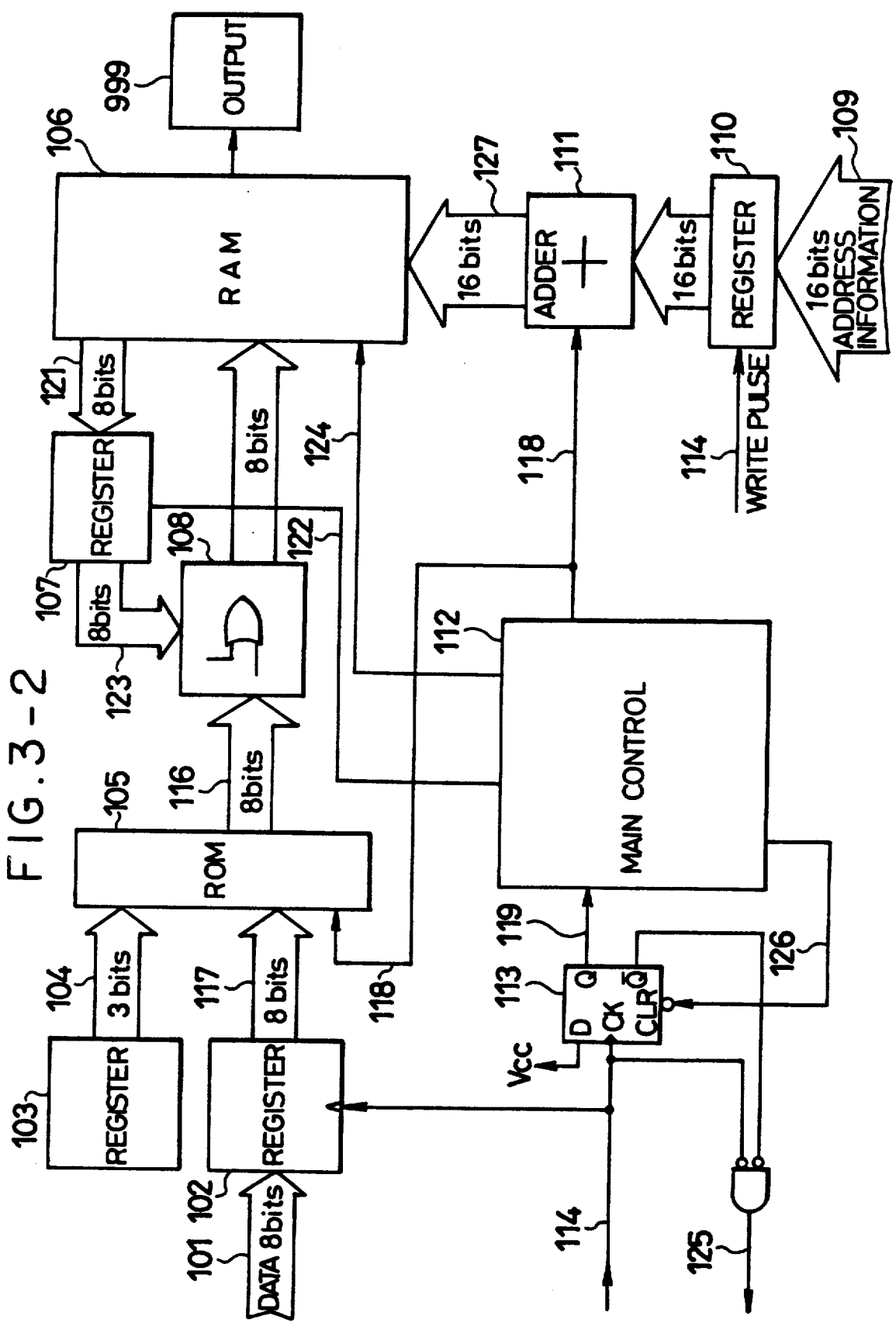

FIG. 3-1 is a block diagram showing the relation between the host computer 10 and the printer 1. Character code data and control orders which are transmitted from the host computer 10 are inputted to a CPU 200 in a data control section 100. The CPU 200 discriminates the character code data from among the input data and converts this character code data into the dot pattern data by a dot pattern generator 300 and outputs it to a data converting section 400. The data converting section 400 performs a predetermined data conversion such as overlap writing of the data or the like and stores the data into a RAM 106. The data stored in the RAM 106 is address controlled by the CPU 200 and is sequentially read out and is sent to an output equipment (printing section) 999. In the printing section 999, for instance, a laser beam is modulated in accordance with that data and an electrostatic latent image is formed on a photo sensitive material and this electrostatic latent image is developed. Thereafter, it is transferred onto a sheet and the sheet after completion of the copy transfer is discharged onto the paper discharge section 4 (FIG. 2).

The CPU 200 performs the communication control with the host computer 10, input/output controls for the operation display section 2, etc.

In the embodiment, data is processed and written independently of the operation of the CPU 200 using the time interval when the CPU 200 takes in a next order or the time interval when it accesses other devices, thereby lightening a load of the CPU 200 itself and also making it possible to realize a high data processing speed. The invention will then be explained with reference t the drawings.

FIG. 3-2 is a block diagram showing the details of the data converting section 400 shown in FIG. 3-1. FIG. 4 is a timing chart of each signal shown in FIGS. 3-1 and 3-2. In FIG. 3-2, a numeral 101 denotes a data read out from the data generating section 300 by the CPU 200 on the basis of the code information from the host computer 10; 102 is a register to latch that data; 103 a register to output information 104 representing that by how many bits the data 101 is shifted; 105 a read only memory (hereinafter, referred to as a ROM); 106 the random access memory of 128 Kbytes (hereinafter, referred to as a RAM); 107 a register to latch the data read out from the RAM 106; 108 an OR gate; 110 a register to latch address information 109 from the CPU; 111 an adder; 112 a main control unit having a microprocessor for controlling the timings in the embodiment; and 113 to a D type flip flop (hereinafter, referred to as a DFF) to latch a write pulse 114 from the CPU 200. A signal 118 is used to designate addresses and data into the RAM when the data is written in continuous addresses in the RAM 106. When the signal 118 is "0", it means the address designated by the CPU 200. When it is "1", "1" is added to the address designated by the CPU 200. The information stored in the RAM 106 is outputted to the various kinds of output equipment 999 such as an ink jet printer, LED printer, LBP, etc. The RAM 106 may be an arithmetic operating unit such as a microprocessor.

The VALID states of the signal 109 in FIG. 4 sequentially represent, for example, the RAM 106 write cycle, next order taking in cycle, CG readout cycle, and write cycle into the RAM 106. Also, the signal 101 likewise sequentially indicates the write data, order information, readout data, and write data.

The operation of the embodiment will now be described further in detail hereinbelow with reference to FIGS. 3-1, 3-2 and 4. It is assumed that the information representing that by how many bits the data is shifted and written into the RAM 106 has been preliminarily stored in the register 103 from the CPU 200.

Figure 5:
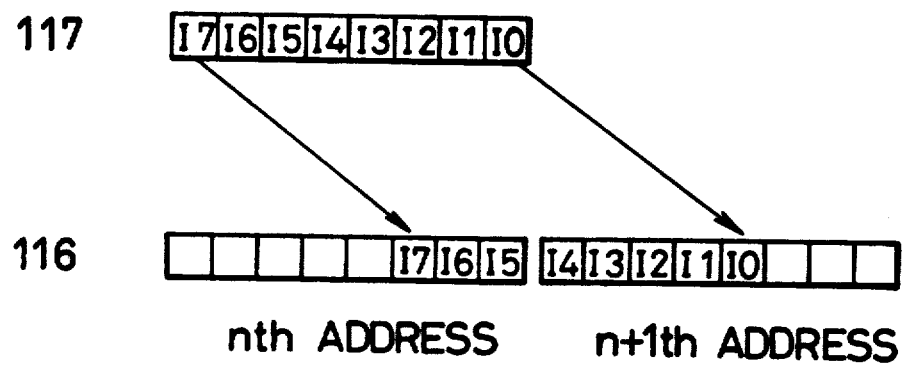
FIG. 5 is an explanatory diagram of a data shift.

For instance, FIG. 5 is a diagram of an example showing the data shift. As in this example, in the case where data 117 of which the 8-bit data 101 was latched is shifted by five bits and is written, information of "101" in the binary form is preliminarily stored in the register 103. Next, information as shown in FIG. 6 has been preliminarily stored in the ROM 105. For instance, when the content of the information 104 (information representing by how many bits the data 101 is shifted) is "101" in the binary form and the signal 118 is "0", the address is the address designated by the CPU 200 and is the information indicating that the data is shifted by five bits. Thus, an output 116 of the ROM 105 is "0 0 0 0 0 $I_7 I_6 I_5$" ($I_n$ is 0 or 1). When the signal 118 is "1", the address is increased by "1", so that the output 116 is "$I_4 I_3 I_2 I_1 I_0$ 0 0 0".

The operation to write data in the RAM 106 will then be explained in detail. The data 101 and address information 109 to be written into the RAM 106 are outputted from the CPU 200 and then the write pulse 114 is outputted (① in FIG. 4).

The write pulse 114 is latched into the DFF 113 in response to the leading edge (201 in FIG. 4) of the write pulse 114 and at the same time the data 101 and address information 109 are respectively latched into the registers 102 and 110. The latched address information is transmitted to the RAM 106 through the adder 111. After an expiration of a predetermined access time (② in FIG. 4), data 121 in that address is outputted from the RAM 106 and is latched into the register 107 in response to a pulse 122 (③ in FIG. 4) from the main control unit 112.

The OR gate 108 serves to overlappingly write the data 116 on the data which has already been written in the RAM 106, thereby enabling a character or figure to be overlappingly written. Namely, the OR gate 108 gets OR of an output 123 of the register 107 and the output 116 of the ROM 105. An output of the OR gate 108 is written in the RAM 106 due to a write pulse 124 from the main control unit 112 (④ in FIG. 4).

When a WAIT signal 125 from the circuit according to the embodiment is "0", the CPU 200 has already been performing the next order execution cycle.

Next, the main control unit 112 sets the signal 118 from "0" to "1" in order to write the data corresponding to the portion overflowing into the next address into the RAM 106 when the data 117 is shift processed by the ROM 105 (305 in FIG. 4).

In response, "1" is added to the address in the RAM 106 due to the adder 111. On the other hand, the data 116 becomes the data in the overflowing portion of the data 117.

In the next write cycle, in a similar manner as the previous time, the information 121 from the RAM 106 is latched (⑥ in FIG. 4) into the register 107 in response to a pulse 122 and the OR signal is obtained by the OR gate 108 and then the output of the OR gate 108 is written in the RAM 106 (⑦ in FIG. 4) in response to the pulse 124. During this interval, the CPU 200 prepares the next data 101 and address information 109 and changes the write pulse 114 from the CPU 200 from "1" to "0" at a timing 202 in FIG. 4. However, the WAIT signal 125 simultaneously changes from "0" to "1" (300 in FIG. 4) and this causes the CPU 200 to wait, so that the CPU 200 enters the WAIT cycle in this state. After completion of the writing into the RAM 106, the main control unit 112 outputs a pulse 126 (⑧ in FIG. 4) and the WAIT signal 125 becomes a "0" level to clear the register 113 (301 in FIG. 4). Thus, the WAIT cycle of the CPU 200 is released and the new address information 109 and data 101 are latched into the registers 110 and 102 at a timing 203 in FIG. 4. Then, the main control unit 112 enters the next RAM write cycle.

In the embodiment, a description has been made by setting the data 101 to eight bits and the address information 109 to sixteen bits; however, it is obvious the invention can be also embodied even if the number of bits is set to any other values.

Figure 7:
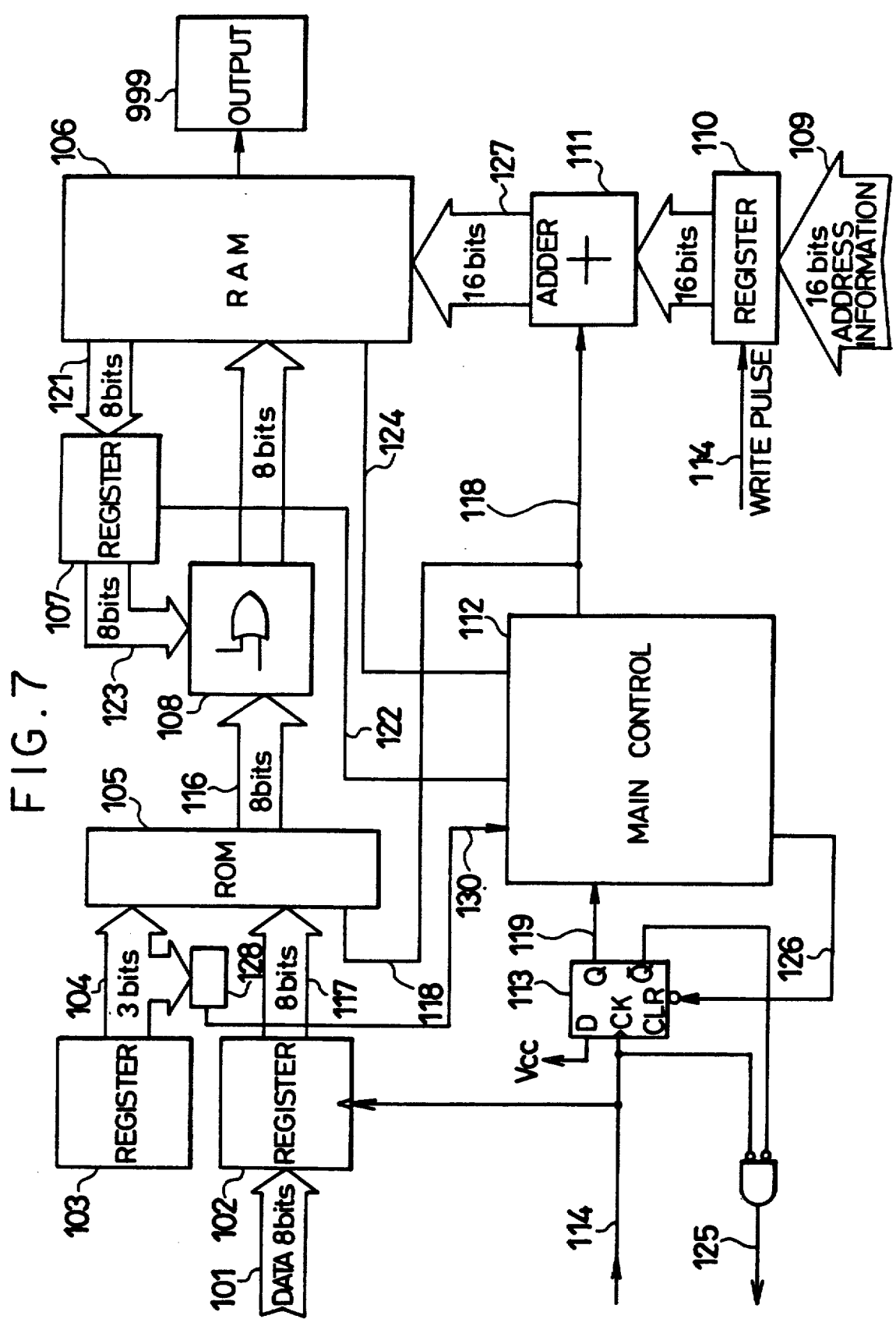
FIGS. 7, 8 and 11 are diagrams showing other embodiments of the data converting section.

FIG. 7 shows another embodiment of the invention, in which the similar parts and components as those shown in FIG. 3-2 are designated by the same reference numerals and their descriptions are omitted.

A numeral 128 denotes a logic circuit to control the writing into the RAM 106 by setting a signal 130 to "1" when the data 104 is "000" in the binary form.

When the data 104 is "000", it means that the data 117 is shifted by 0 bit and there exists no portion where the data 117 overflows into the next address, so that there is no need to perform the writing operation into the next address in the RAM 106.

Therefore, at this time, the signal 130 is set to "1" and is transmitted to the main control unit 112 to perform the writing operation into the RAM 106 only once, thereby further improving the data processing speed of this circuit.

As described in detail above, according to the embodiment, the CPU can execute another order independently of the writing operation into the RAM, so that a load to the CPU is lightened and the data processing speed is also remarkably improved. Further, there is no need to use a super high speed logic circuit; therefore, there is an effect of a reduction of costs and this makes it possible to provide a low-priced data processing apparatus with high performance.

Next, there will be explained an example of the data converting section 400 whereby the operation timings for the overlap write control into the memory and for the clearing operation control of the data in the memory are generated by the same circuit, thereby allowing the data reading from the memory and the clearing of the memory to be simultaneously performed.

Figure 8:
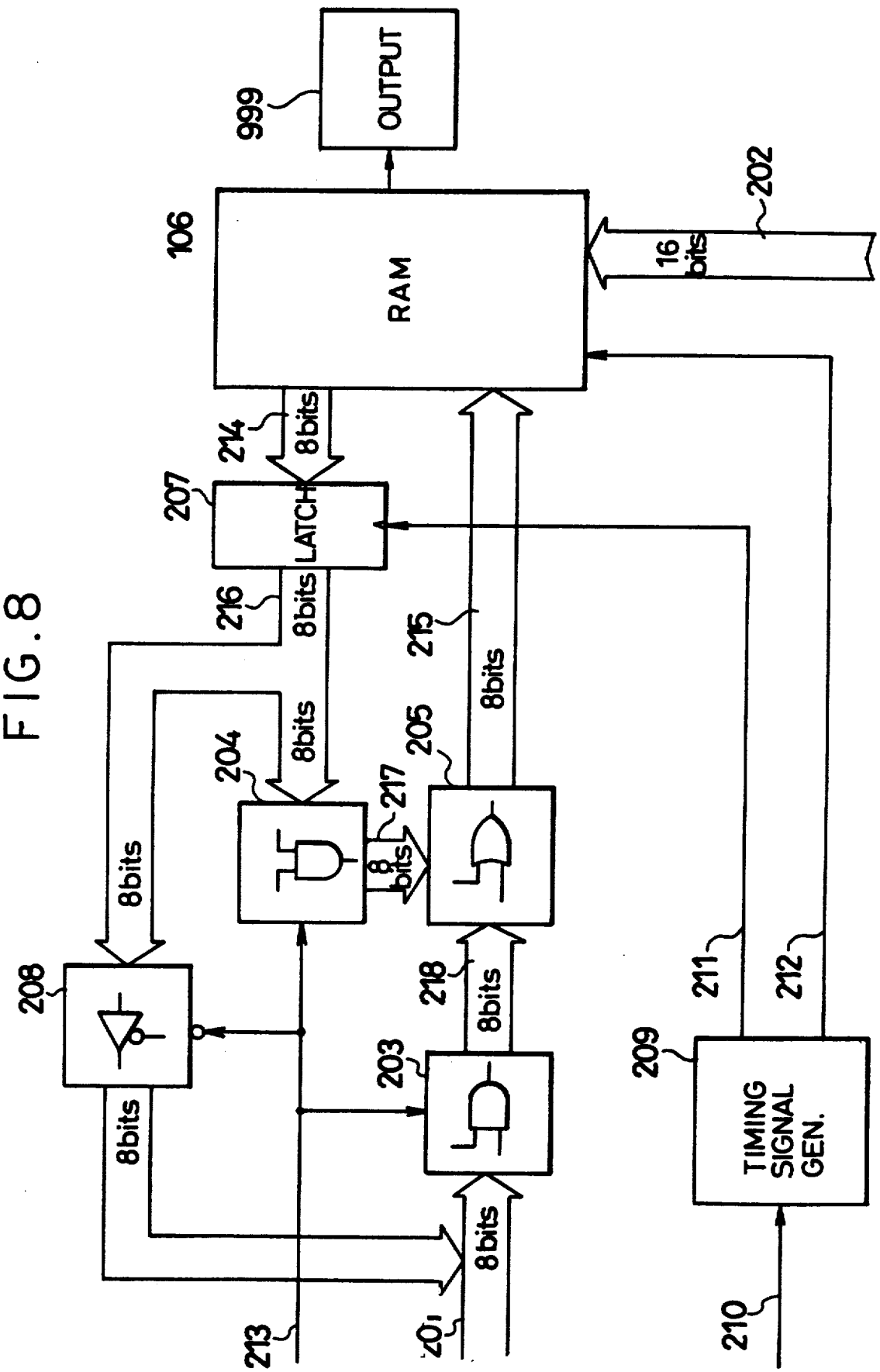

FIG. 8 is a block diagram showing this embodiment, in which the similar parts and components as those shown in FIG. 3-2 are designated by the same reference numerals. In the diagram, a numeral 201 denotes a dual direction data bus of the CPU 200. This data bus 201 consists of eight bits. A numeral 202 is likewise a 16-bit address bus of the CPU; 203 and 204 are AND gates; 205 an OR gate; 207 a latch; 208 a three-state gate; and 209 a timing signal generator for generating signals 211 and 212 after an expiration of a constant time from the leading edge of a signal 210 from the CPU 200. Those generation timings are shown in timing charts of FIGS. 9 and 10.

A signal 213 is a level signal which becomes an H level when the CPU 200 is in the writing operation and becomes an L level when it is in the reading operation.

Figure 9:
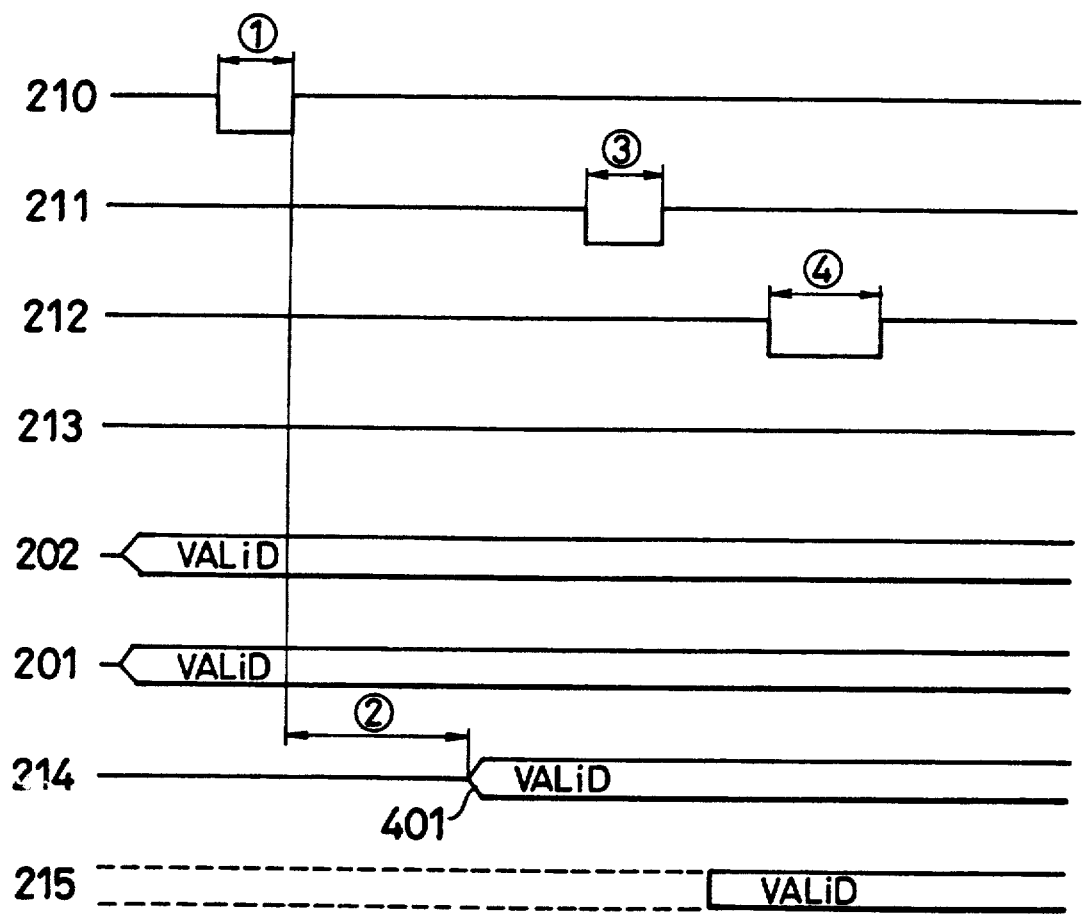
FIGS. 9 and 10 are timing charts of each signal shown in FIG. 8.
Figure 10:
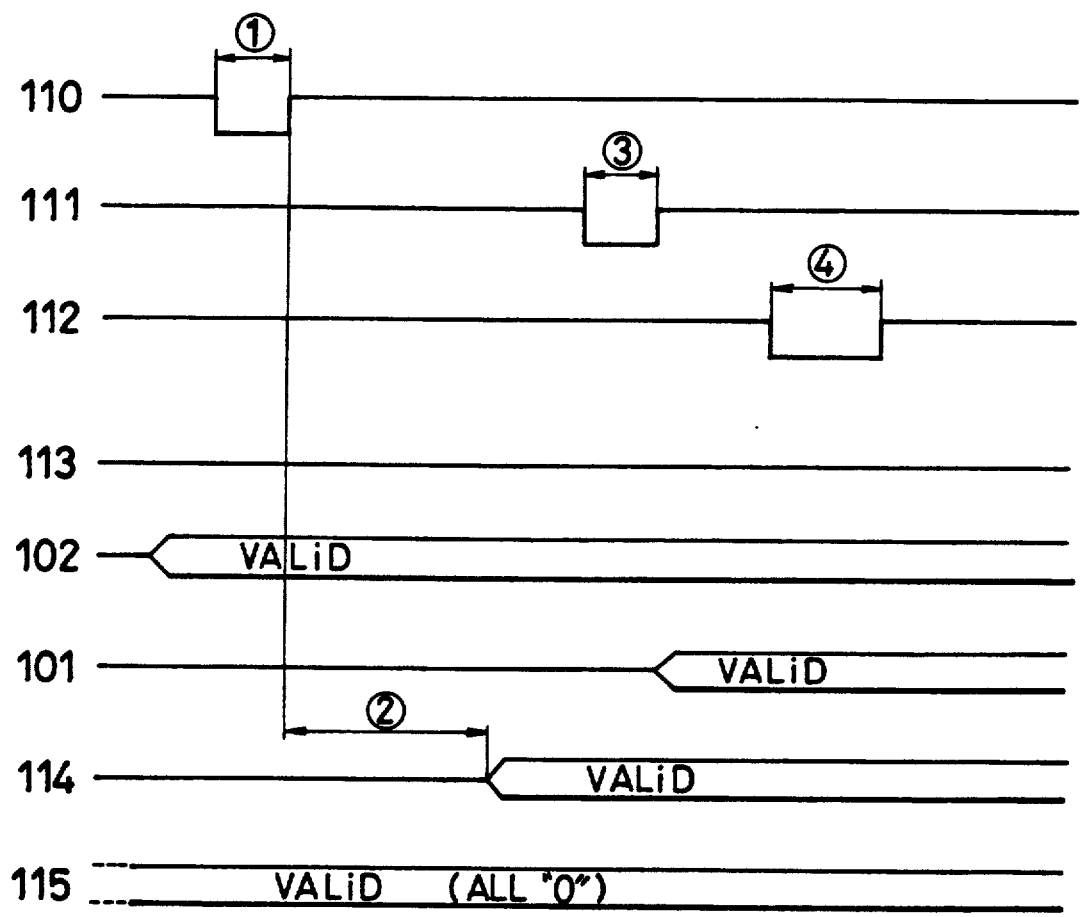

FIG. 9 shows the timing of each signal when the signal 213 is at an H level, namely, when the CPU 200 is in the writing operation. FIG. 10 shows the timing of each signal when the signal 213 is at a L level, that is, when the CPU is in the reading operation.

The operation of the embodiment will then be explained hereinbelow with reference to FIGS. 8 to 10.

First, the operation when the CPU 200 performs the writing operation will be explained. The code information transmitted from the host computer 10 is converted to the corresponding dot pattern information by the CPU 200 as described above and it is outputted onto the data bus 201. Next, to develop the dot pattern data outputted onto the data bus 201 into the RAM 106, the CPU 200 outputs the address information 202 to the RAM 106 and sets the signal 213 at an H level (when the CPU performs the writing operation). Thereafter, the CPU transmits the signal 210 to the timing signal generator 209, thereby activating the timing signal generator 209 (① in FIG. 9).

In response to the address information 202 received, the RAM 106 obtains a predetermined access time (② in FIG. 9) and thereafter it outputs a read data 214 at a timing indicated at 401 in FIG. 9. The read data 214 is latched into the latch 207 in response to the signal 211 (③ in FIG. 9). Since the signal 213 is at an H level, the AND gates 203 and 204 are open. Therefore, the contents of information 216 and 217 are the same, and the contents of information 201 and 218 are identical, respectively.

On the contrary, the three-state gate 208 is closed

Both information 217 and 218 are inputted to the OR gate 205 to get OR and an output of the OR gate 205 is stored as an information 215 into the RAM 106 by the write signal 212 into the RAM 106 (④ in FIG. 9).

Namely, the OR information with the data which has been preliminarily stored in the RAM 106 is written and this equivalently corresponds to the overlap writing.

Next, the operation when the CPU performs the reading operation will be explained with reference to FIG. 10.

The dot pattern data developed in the RAM 106 is transmitted to a printing section (not shown) after completion of the development. There is no need to keep any more the dot pattern data which has been once transmitted to the printing section; therefore, it is necessary to clear the content in the address in that portion of the RAM.

The CPU sets the signal 213 at an L level to send the dot pattern data developed in the RAM 106 to the printing section 999 (when the CPU performs the reading operation) and transmits the address information 202 to the RAM 106 in order to read out the content of the RAM 106.

In addition, as shown in FIG. 10, the CPU sends the signal 210 to the timing signal generator 209, thereby activating the generator 209 (① in FIG. 10).

After an expiration of a predetermined access time (② in FIG. 10), the read data 214 is outputted from the RAM 106 and is latched into the latch 207 by the latch signal 211 (③ in FIG. 10).

The three-state gate 208 is open since the signal 213 is at an L level, so that the same content as the read data 214 from the RAM 106 is transmitted onto the data bus 201. On the contrary, since the AND gates 203 and 204 are together closed, both information 217 and 218 are all "0", so that the information 215 is all "0".

The information 215 whose content is all "0" is simultaneously written into the RAM 106 by the write signal 212 (④ in FIG. 10), namely, the RAM 106 is cleared.

As described above, when the CPU performs the writing operation, the overlap writing operation is simultaneously executed. When the CPU performs the reading operation, the clearing operation of the RAM is simultaneously executed. Further, the timing signals for those operations are generated by use of the same timing signal generator, thereby enabling the processing speed of the CPU to be remarkably improved and enabling a burden on the CPU to be lightened.

In addition, when the CPU performs the reading operation, the RAM is simultaneously cleared by the same timing signal generator, thereby making it possible to improve the processing speed of the CPU significantly.

Further, it is possible to provide an inexpensive data processing apparatus which can process data at a high speed.

On the other hand, in the case where the data conversion such as the overlap writing of the data or the like is performed and thereafter the data is stored into the RAM as in the foregoing example, if this RAM is further used as a flag or stack, the content of the flag or stack will have been changed due to the data conversion.

The following example relates to the case where the RAM is divided into the area where the data conversion writing is possible and the area where the data conversion writing is impossible and this divided RAM is used. This embodiment will now be described in detail hereinbelow with reference to FIG. 11 and subsequent drawings.

Figure 11:
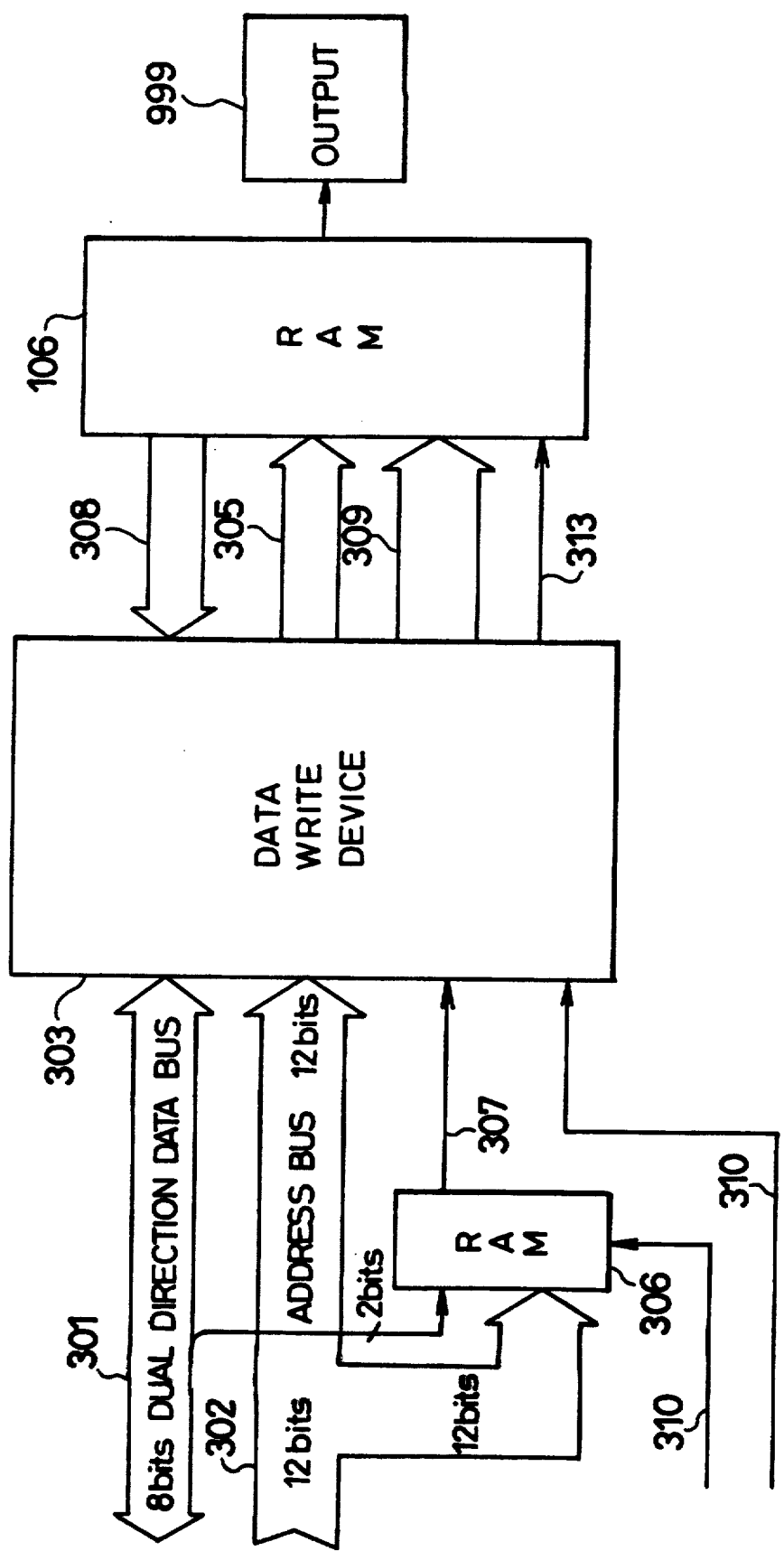

FIG. 11 is a block diagram in this embodiment of the data converting section 400 shown in FIG. 3-1.

In FIG. 11, a numeral 301 denotes a dual direction data bus of the CPU 200. This data bus is constituted by eight bits. A numeral 302 is likewise an address information of the lower significant twelve bits of the 16-bit address bus of the CPU 200; 303 a data write device; and 106 a random access memory (RAM). The data 301 is transmitted through the data write device 303 and is written as a data 305 into the RAM 106 (128 Kbytes).

The RAM 306 transmits a signal 307 representing whether the data conversion is performed (1) or not (0) to the data write device 303 from the address information 302, which is directly concerned with the present invention. The RAM 306 may be an arithmetic operating unit such as a microprocessor.

Figure 12:
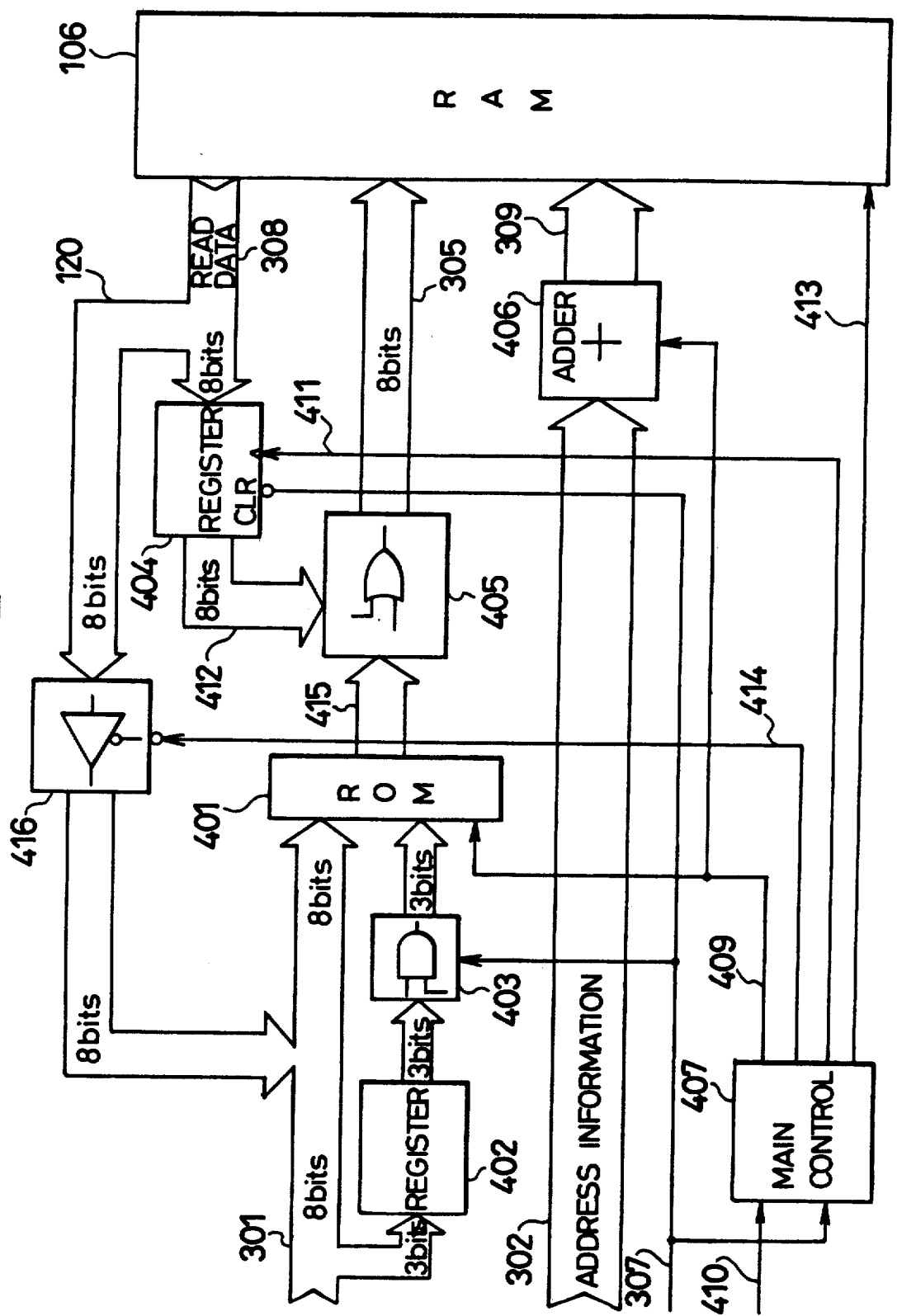
FIG. 12 is a block diagram showing the details of a data write device shown in FIG. 11.

FIG. 12 is a block diagram showing the foregoing data converting write device 303 further in detail.

A reference numeral 401 denotes a read only memory (hereinafter, referred to as a ROM), 402 is a register; 403 an AND gate; 404 a register to latch a read data 308 from the RAM 106; 405 an OR gate; 406 an adder; 407 a main control unit; 408 a shift information indicating that by how many bits the data from the RAM 106 is shifted; and 409 a signal representing that the address in the RAM 106 is (1) increased by "1" or (0) used as it is.

Figure 13:
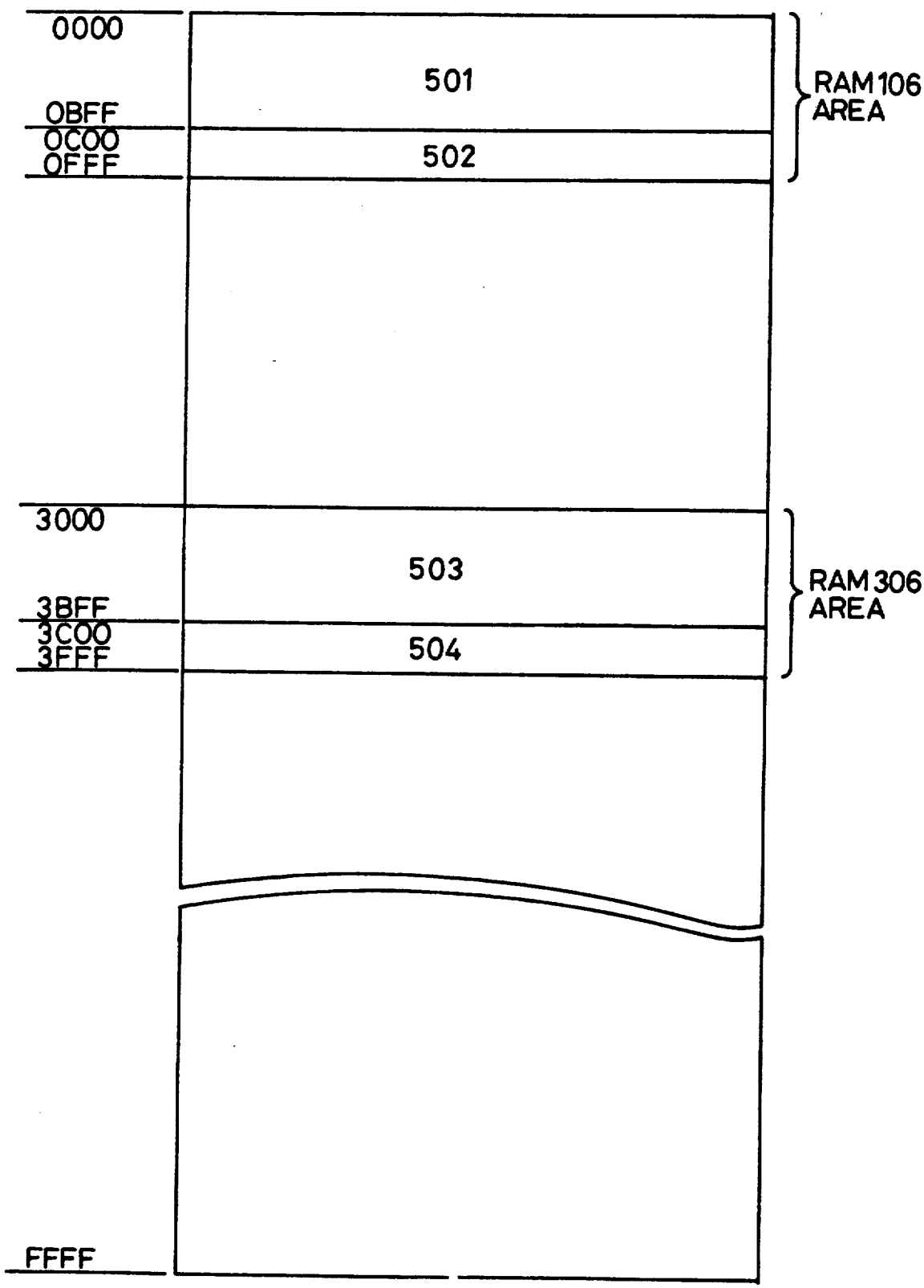
FIG. 13 is a diagram showing address areas in a RAM.

FIG. 13 is a diagram of an example showing address areas locating on a 16-bit address map with respect to the RAMs 106 and 306.

In FIG. 13, the area in the RAM 106 unconditionally corresponds to the area in the RAM 306 in the relation of one-to-one correspondence. It is now assumed that in the area in the RAM 106 in FIG. 13, a numeral 501 indicates an area where the data conversion is performed as a buffer of the dot data and 502 represents an area where no data conversion is performed since it is used for a stack or flag of the CPU 200.

As shown in FIGS. 11 and 12, in the case where the lower significant 12 bits are used as the address input 302 to the RAM, respectively, "1" is preliminarily stored in an area 503 in the RAM 306 and "0" is preliminarily stored in an area 504 in the RAM 306 by the write signal (310 in FIG. 1) from the CPU 200.

Namely, in FIG. 13, when the area 501 is accessed, the signal 307, which is the output of the RAM 306, indicating whether the data conversion is performed or not is "1". This means that the data conversion is performed. On the other hand, when the area 502 is accessed, the output 307 is "0", namely, it is the signal representing that no data conversion is executed.

The case where the area 501 is accessed will be first described.

The data which is read out from the dot data generating section 300 (FIG. 3-1) by the CPU 200 on the basis of the code information from the host computer 10 is transmitted onto the data bus 301. The data write device 303 shifts the information from the data bus 301 as shown in FIG. 5 (showing an example whereby the data is shifted by five bits) and thereafter transmits it through the ROM 401 and obtains an OR signal with the read data 308 of the RAM 106 by the OR gate 405 and then writes the OR into the continuous addresses in the RAM 106 as shown in FIG. 12.

The data shifting operation is similar to that in the case of FIG. 3-2; therefore, its description is omitted.

The case where the signal 307 is "1", namely, where the data conversion (shift) is performed will now be described. In this case, since the AND gate 403 is open, the content of the data 408 is the same as the content (shift information) of the register 402. The data 301 and address information 302 to be written into the RAM 106 are output from the CPU 200 and a write order 410 is simultaneously outputted to the main control unit 407. In addition, the data 301 is shifted by the ROM 401 and is output as a data 415.

After an elapse of a predetermined access time, the data 308 is outputted from the RAM 106 and is latched into the register 404 by a latch signal 411 from the main control unit 407.

The signal 409 is initially set to "0" and indicates that "1" is not added to the address information, so that the address information 309 is the same as the content of the address information 302. On one hand, the data 415 and 412 are input to the OR gate 405 to get OR and this OR is written into the RAM 106 in response to a RAM write signal 413 from the main control unit 407.

A signal 414 becomes "0" only when the data in the RAM 106 is read out by the CPU 200, thereby opening a three-state gate 416.

Next, the main control unit 407 sets the signal 409 for adding "1" to the address information to "1" from "0", thereby writing into the RAM 106 the data in the portion overflowing into the next address when the data 301 is shifted by the ROM 401. Thus, the output 415 of the ROM 401 becomes the data in the portion overflowing into the next address of the data 301 (in the case where the signal 409 in FIG. 14 is "1"). An output 309 of the adder 406 becomes a value of which "1" was added to the address information 302. Similarly, the RAM write signal 413 is output from the main control unit 407, so that the data in the overflow portion is written in the next address in the RAM 106.

Next, the case where the CPU accesses the area 502 in the RAM 106 in FIG. 13 will be described. At this time, the output 307 of the RAM 306 in FIG. 11 is "0" and indicates that no data conversion is performed. When the output 307 is "0", the AND gate 403 in FIG. 12 is closed and the data 408 indicating the data shift information becomes "000". Thus, the output 415 of the ROM 401 becomes the value of which the data 301 was shifted by 0 bit, that is, the data 301 and the output 415 are the same. On the contrary, when the output 307 is "0", the register 404 is cleared, so that the data 305 becomes equal to the data 301 and 415.

In addition, in this case, the data 301 is not shifted, so that no data overflows into the next address in the RAM. Consequently, the main control unit 407 outputs the write signal 413 only once.

As described above, when the signal 307 is "1", the data 301 is data converted and is written into the RAM 106. When the signal 307 is "0", the data 301 is not subjected to the converting process but is written as it is into the RAM 106.

As explain above, data can be processed at a high speed.

In addition, the inside of the same RAM can be freely set into the area where the data conversion and writing are possible and the area where the data conversion writing is impossible. Therefore, a RAM of a large capacity can be effectively used and it is unnecessary for the CPU to be conscious of it. Thus, there are effects such that the data processing speed can be made fast and a burden on the CPU is reduced.

Although the present invention has been shown and described with respect to preferred embodiments, various changes and modifications which are obvious to a person skilled in the art to which the invention pertains are deemed to lie within the spirit and scope of the invention.

What is claimed is:

1. A recording apparatus for recording an image transmitted from a host in the form of code data and control data, comprising:
   conversion means for converting the code data transmitted from the host into image data;
   a first random access memory capable of storing therein the image data converted by said conversion means and the control data, the image data and the control data being stored in accordance with address data transmitted from the host, the address data representing which area of said first random access memory stores the image data and which area stores the control data;
   data processing means for conducting write-processing in an overlapping manner on image data previously stored in said first random access memory and on image data newly entered into said apparatus, and for storing the processed data in said first random access memory;
   recording means for recording the image data which has been write-processed in the overlapping manner by said data processing means and stored in said first random access memory; and
   control means for controlling said data processing means such that said data processing means can conduct the write-processing in the overlapping manner in response to address data transmitted from the host that represents the area of said first random access memory which stores image data and said data processing means cannot conduct write-processing in the overlapping manner in response to address data transmitted from the host that represents the area of said first random access memory which stores control data.

2. An apparatus according to claim 1, wherein said first random access memory is arranged to store the image data as bit image data.

3. An apparatus according to claim 1, wherein said control means is comprised by a central processing unit wherein said first random access memory is adapted to store a flag as control data to control said central processing unit.

4. An apparatus according to claim 1, wherein said first random access memory is arranged so that image data is stored in a first area and control data is stored in a second area different from said first area.

5. An apparatus according to claim 4, wherein said control means is operable to produce and transmit a data processing enable signal to said data processing means to enable said data processing means to conduct write-processing in an overlapping manner when image data is stored in said first area and said control means is operable to produce and transmit a data processing disable signal to said data processing means to disable said data processing means from conducting write-processing in an overlapping manner when control data is stored in said second area.

6. An apparatus according to claim 5, further comprising a second random access memory associated with said control means, wherein said control means accesses said first random access memory and said second random access memory simultaneously.

7. An apparatus according to claim 6, wherein said second random access memory is operable to produce the data processing enable signal when said first area of said first random access memory is accessed, and to produce the data processing disable signal when the second area of said first random access memory is accessed.

* * * * *

UNITED STATES PATENT AND TRADEMARK OFFICE
CERTIFICATE OF CORRECTION

PATENT NO. : 5,010,513
DATED : April 23, 1991
INVENTOR(S) : SHIGERU UEDA

It is certified that error appears in the above-identified patent and that said Letters Patent is hereby corrected as shown below:

COLUMN 2

Line 6, "bit thereafter" should read
        --bit images in the random access memory
        in the printer and thereafter--.

COLUMN 3

Line 64, "t" should read --to--.

COLUMN 6

Line 31, "a" should read --an--.

COLUMN 9

Line 51, "explain" should read --explained--.

Signed and Sealed this

Twenty-fourth Day of November, 1992

Attest:

DOUGLAS B. COMER

*Attesting Officer*      *Acting Commissioner of Patents and Trademarks*